(12) United States Patent
Badgley (10) Patent No.: US 7,040,278 B2
(45) Date of Patent: May 9, 2006

(54) INTEGRATED MICROTURBINE SYSTEM (75) Inventor: Patrick Badgley, Columbus, IN (US)

(73) Assignee: Advanced Technologies, Inc., Starkville, MS (US)

( * ) Notice: Subject to any disclaimer, the term of this patent is extended or adjusted under 35 U.S.C. 154(b) by 131 days.

(21) Appl. No.: 10/737,053

(22) Filed: Dec. 16, 2003

(65) Prior Publication Data
US 2005/0126175 A1 Jun. 16, 2005

(51) Int. Cl.
F02G 3/00 (2006.01)
(52) U.S. Cl. .................................... 123/204
(58) Field of Classification Search ............... 60/39.45, 60/39.511, 39.6, 39.62, 39.63, 726, 729; 123/204
See application file for complete search history.

(56) References Cited
U.S. PATENT DOCUMENTS 3,989,011 A * 11/1976 Takahashi ................ 123/204
4,098,256 A * 7/1978 Sieck ...................... 123/204
5,568,796 A * 10/1996 Palmer .................... 123/204
6,307,278 B1 10/2001 Nims et al.
6,484,504 B1 11/2002 Aquino et al.
6,494,043 B1 12/2002 Choroszylow et al.

* cited by examiner

Primary Examiner—Louis J. Casaregola
(74) Attorney, Agent, or Firm—Stites & Harbison PLLC; John E. Vanderburgh (57) ABSTRACT A microturbine for the generation of mechanical and electrical power comprising a positive displacement axial vane rotary compressor and an axial vane rotary expander. The compressor and expander are joined by a common shaft. The system further includes at least one combustor for heating a driving fluid prior to its entering the expander. The driving fluid, such as air, enters the compressor at ambient conditions of pressure and temperature and is compressed. The compressed driving fluid is preheated by the exhaust from the expander, then passes through a combustor to bring its temperature to a desired expander inlet temperature and then enters the expander where the expansion force of the hot driving fluid acting against the vanes of the expander is translated into rotation of the common shaft for driving both the compressor and a suitable power device such as an electrical generator.

6 Claims, 6 Drawing Sheets

INTEGRATED MICROTURBINE SYSTEM

FIELD OF THE INVENTION

This invention relates to microturbine systems and more particularly to an improved system employing axial vane rotary devices.

BACKGROUND OF THE INVENTION

Local electrical power generating systems are used to provide emergency power for facilities where loss of power can result in catastrophic or fatal consequences. For example hospitals normally have backup power generators in the event of a power failure to power the equipment necessary for patient care and to insure electrical supply to surgeries and the like. Similarly, certain industrial processes cannot be interrupted without substantial financial loss and in some cases exposure to toxic or explosive gases More recently, power fluctuations resulting in "brown outs" have raised interest in backup electrical generating equipment. In addition, the production of local power can result in lower usage of externally generated power with a resulting reduction in the utility bill from the external power company.

Basically, a local power generating system consists of a suitable motor or other power source that drives a generator for production of electrical power. A concern with any such system is the emission from the power source and the efficiency of the power source that drives the electrical generator of the system.

Various engines are used or have been proposed for use as the power source. Most commonly used is the conventional internal combustion engine (Otto cycle) or the diesel engine. (compression ignition). External combustion engines, such as the steam engine (Rankine cycle), and hot air engines (Sterling cycle) have also been utilized. More recently microturbines based on the gas turbine engine (Brayton cycle) have become reasonably priced and are now widely used. Electrochemical engines (fuel cells) have also been considered for use as the power source for local generating systems.

Although suitable for the purpose, the above mentioned engines are subject to certain deficiencies that can reduce the utility and increase the expense of operation of the local power generating system.

For example, diesel engines are efficient but the emissions from the engine do not meet air quality standards for stationary engines. In most cases particulate traps are required and low sulfur fuel is highly preferred for operation of the engine, raising the maintenance and operational costs of the generating system. Internal combustion engines, although undoubtedly the most widely used engine for local generating systems, are inefficient and are subject to emissions problems.

Both the Rankine cycle engine and the Sterling cycle engine are efficient and can meet emissions standards. However, both types of engines are heavy and may require structural modifications of the installation site. In addition these engines are expensive to manufacture.

Fuel cells also are rated good to excellent in both efficiency and emissions but more work is needed to make them more reliable. In addition, their cost at this time is prohibitive.

Microturbines comprising a compressor and an expander have become popular as power sources for local area electric generation. However, as power sources the are inefficient and expensive although the are generally rated as good with regard to emissions. Gas turbines operate at high speed subjecting the components of the engine to high stresses. The high speeds at which the turbine engines operate require the use of expensive electrical generators additionally raising the overall cost of the system. Also, existing materials of construction limit the operating temperatures that adversely affect the efficiency of the engine.

SUMMARY OF THE INVENTION

In accordance with the present invention there is provided a microturbine system comprising a positive displacement axial vane rotary compressor and an axial vane rotary expander. The system further includes at least one combustor for raising the temperature of a driving fluid that has been compressed prior to entering the expander for driving the expander to produce mechanical energy. The system further includes a heat exchanger recuperator for recovery of some of the heat energy from the expanded driving fluid to preheat driving fluid prior to entering the combustor The compressor and expander are interconnected by a single shaft that may also as the output shaft from the expander.

The microturbine system of the present invention is highly suited for local generation of electrical power as it can operate at lower speed thus allowing the use of less expensive electrical generators. In addition the microturbine system of the present invention provides an efficient and economical power source for other applications, for example powering mechanical tools such as lathes, drills and the like.

More particularly the microturbine system of the invention comprises a positive displacement axial vane rotary compressor and a positive displacement axial vane rotary expander connected by a common shaft. The system further includes at least one combustion unit for heating a driving fluid prior to the expander and a heat exchanger for the recovery of heat from driving fluid exhaust from the expander.

The positive displacement axial vane expander can have up to four inlet paths. In one embodiment of the invention a combustor is provided for each inlet path for heating driving fluid for each path to achieve maximum output power. When there is less load the system can be turned down by turning off up to three of the combustors allowing the system to operate at lower power output and saving fuel.

Other advantages and features of the present invention will become apparent from the following description taken in conjunction with the drawings.

DESCRIPTION OF THE INVENTION

Figure 1:
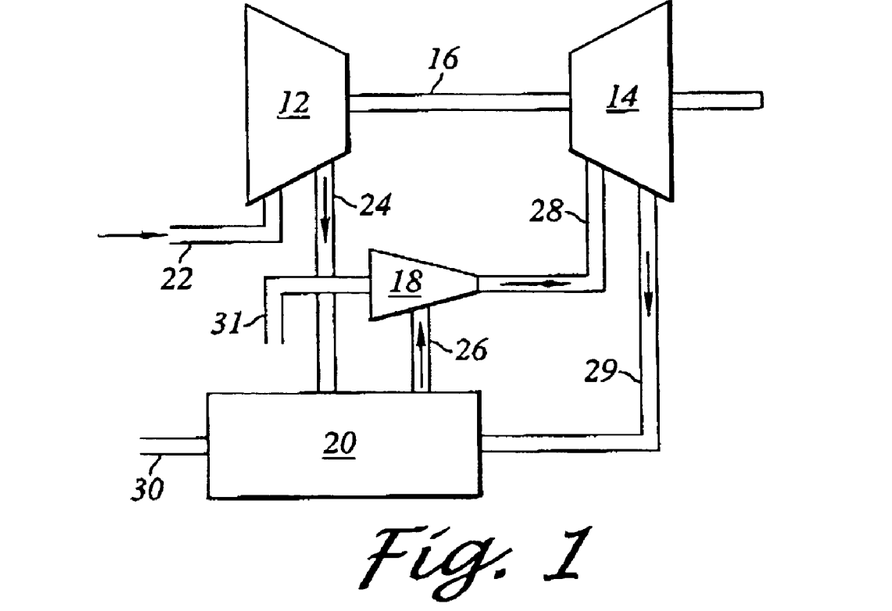
FIG. 1 is a schematic diagram of the microturbine system of the invention.

Referring to FIG. 1 the system 10 of the present invention comprises a positive displacement axial vane rotary compressor 12 and a positive displacement axial vane rotary expander 14 interconnected by a common drive shaft 16. The system 10 further includes a combustor 18 of conventional design for compressing driving fluid and a recuperator 20 for utilization of the heat of the exhaust from the expander 14 to preheat the compressed driving fluid prior to it entering the combustor. A duct 22 leads uncompressed driving fluid to the compressor 12 and a duct 24 leads compressed driving fluid to the recuperator 20 for preheating. A second duct 26 leads preheated compressed driving fluid to the combustor 18 where it is further heated to its expander inlet temperature before entering the expander 14 by means of expander inlet duct 28 An exhaust duct 29 leads the expanded, hot driving fluid back to the recuperator 20 for heat exchange with the compressed driving fluid from the compressor 12 and the substantially cooled exhaust leaves the system through an exhaust line 30. A fuel line 31 communicates with a source of fuel for the combustor 18.

Figure 2:
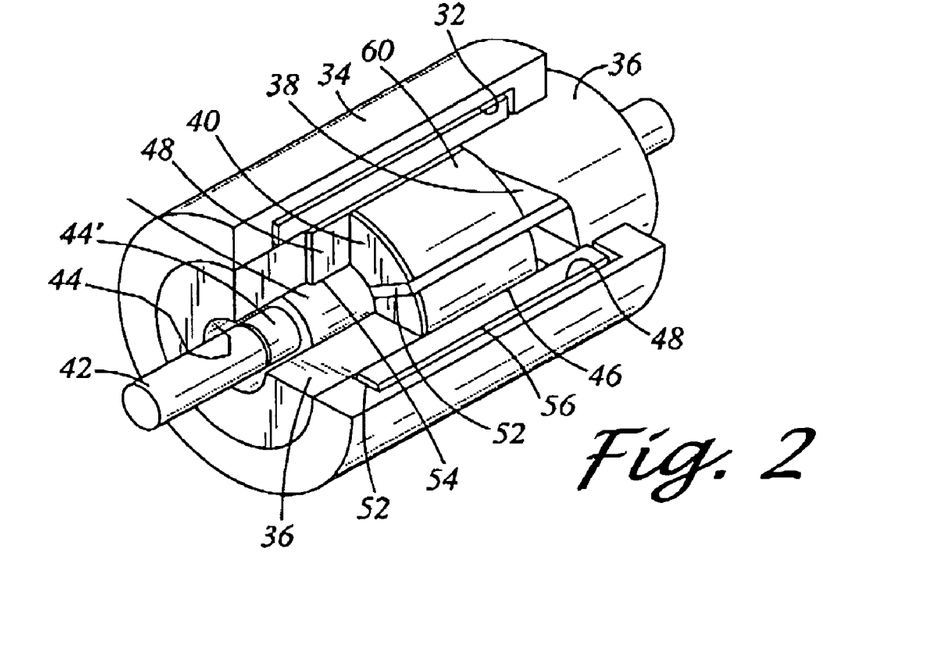
FIG. 2 is a perspective view partially broken away of a simplified axial vane rotary device of the type used in the microturbine system.

A positive displacement axial vane rotary device of the type used for the compressor 12 and the expander 14 is schematically illustrated by FIG. 2. The axial vane device is of the general type described in U.S. Pat. No. 5,509,793, Cherry et al. which is incorporated by reference herein. The axial vane rotary device comprises a stator having a cylindrical inner chamber 32 defined by an annular outer housing 34 and end walls 36. Each end wall 36 has inwardly facing geometrically defined cam surfaces 38, for example undulating or sinusoidal cam surfaces. The cam surfaces 38 are oriented so that a high point or extension of one cam surface on one end wall is aligned with a low point or abbreviated portion of the cam surface of the opposite end wall. A cylindrical rotor 40 is rotatably mounted in the chamber 32 by means of its drive shaft 42 that is journaled in each of the end walls 36 by a fixed inner housing 44. The fixed inner housing 44 comprises a pair of cylindrical members 44' that include suitable bearing assemblies (not shown) in which the drive shaft 42 is journeled for rotation therein. A plurality of slots 46 extend through the rotor 40 and open at the ends of the rotor facing the cam surfaces 38. Each of the slots 46 are adapted for slideably receiving a vane 48. Each vane describes side edges 52, a inner end 54 and an outer end 56.

The rotor 40 preferably includes a cylindrical outer sleeve 60 that encloses the rotor 40 and is integral therewith so that it rotates with the rotor. Although not critical, the outer sleeve 60 can be provided with grooves (not shown) that are aligned with the slots 46 of the rotor 40. When positioned in the slots 46, the outer end 56 of each vane 48 is contained in a corresponding one of the grooves 64. As the outer wing 60 rotates with the rotor 40 the wear on the outer end 56 of the vanes 48 is reduced to the wear caused by the axial movement of the outer end of the vane in the corresponding groove 64. The grooves 64 also aid in supporting the outer ends 56 of the vanes 48.

Figure 3:
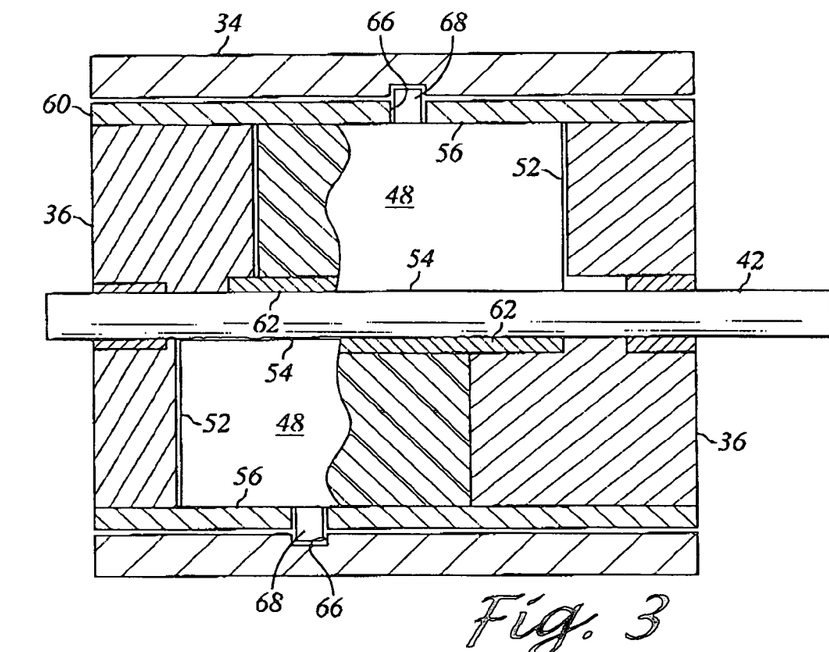
FIG. 3 is a side sectional elevation of the rotor and stationary housings of an axial vane rotary device of the type shown in FIG. 2.
Figure 4:
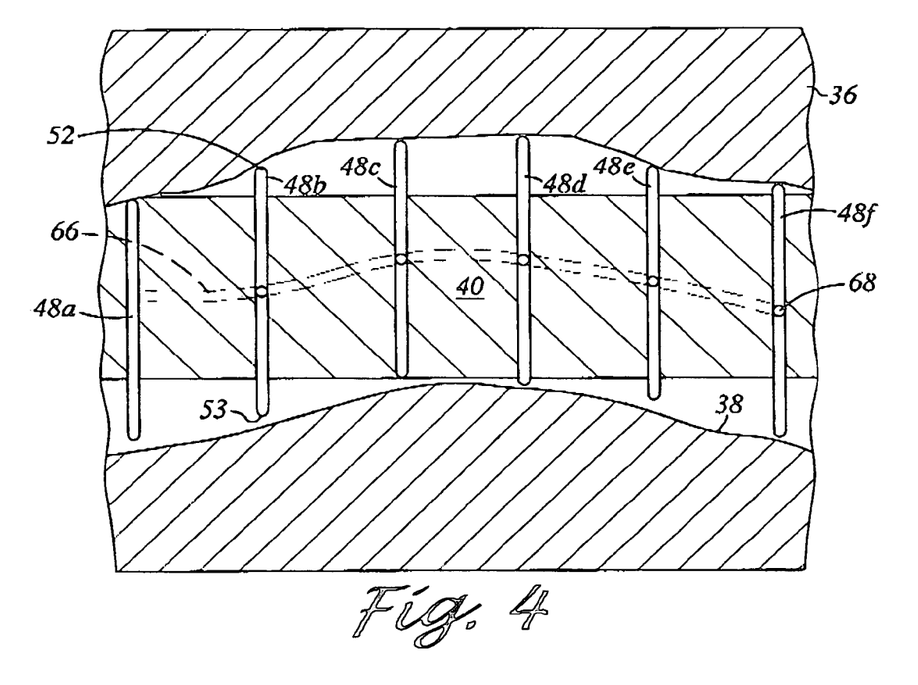
FIG. 4 is an unfolded geometrically developed view illustrating operation of an axial vane rotary device of the type shown in FIG. 2.

Referring to FIGS. 3 and 4, a groove or track 66 that corresponds to the sinusoidal geometric pattern of the cam surfaces 38 is disposed in the inner surface of the stationary outer housing 34. A through-running slot 66 corresponding to the geometric pattern of the track in the inner surface of the stationary outer housing 34 and aligned therewith is provided in the outer wing 60. A guide pin 68 is positioned on the outer end 56 of each vane 48. The guide pin 68 extends through the slot 66 into the track in the inner surface of the stationary housing 34 and serves as a cam follower to impart the axial movement to the vane 48. Guide pins 68 substantially reduce the wear on the side edges 52 and 53 of the vanes 48. As the rotor 40 rotates the vanes 48 axially slide to sequentially increase and decrease the volume between a vane and the vane immediately preceding in the direction of rotation.

Figure 5:
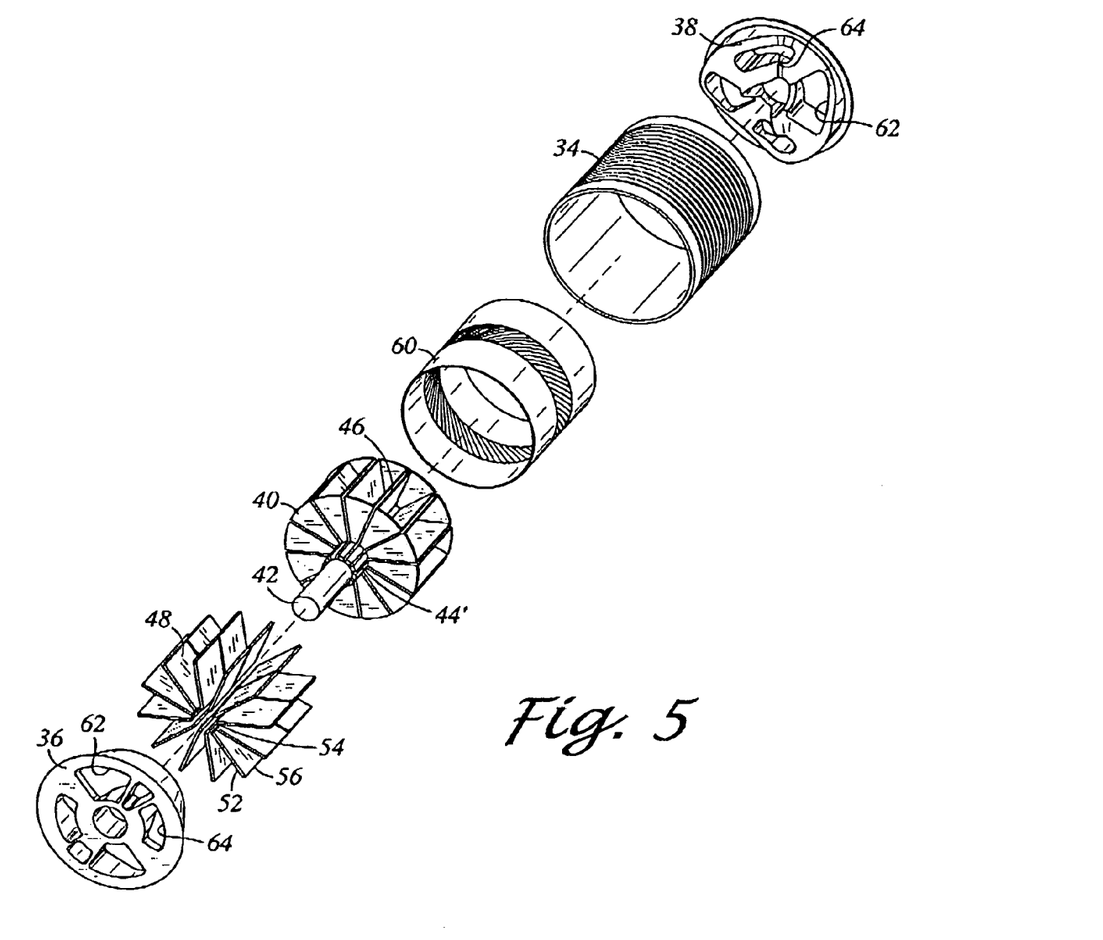
FIG. 5 is an exploded perspective view of a compressor of the microturbine system.
Figure 6:
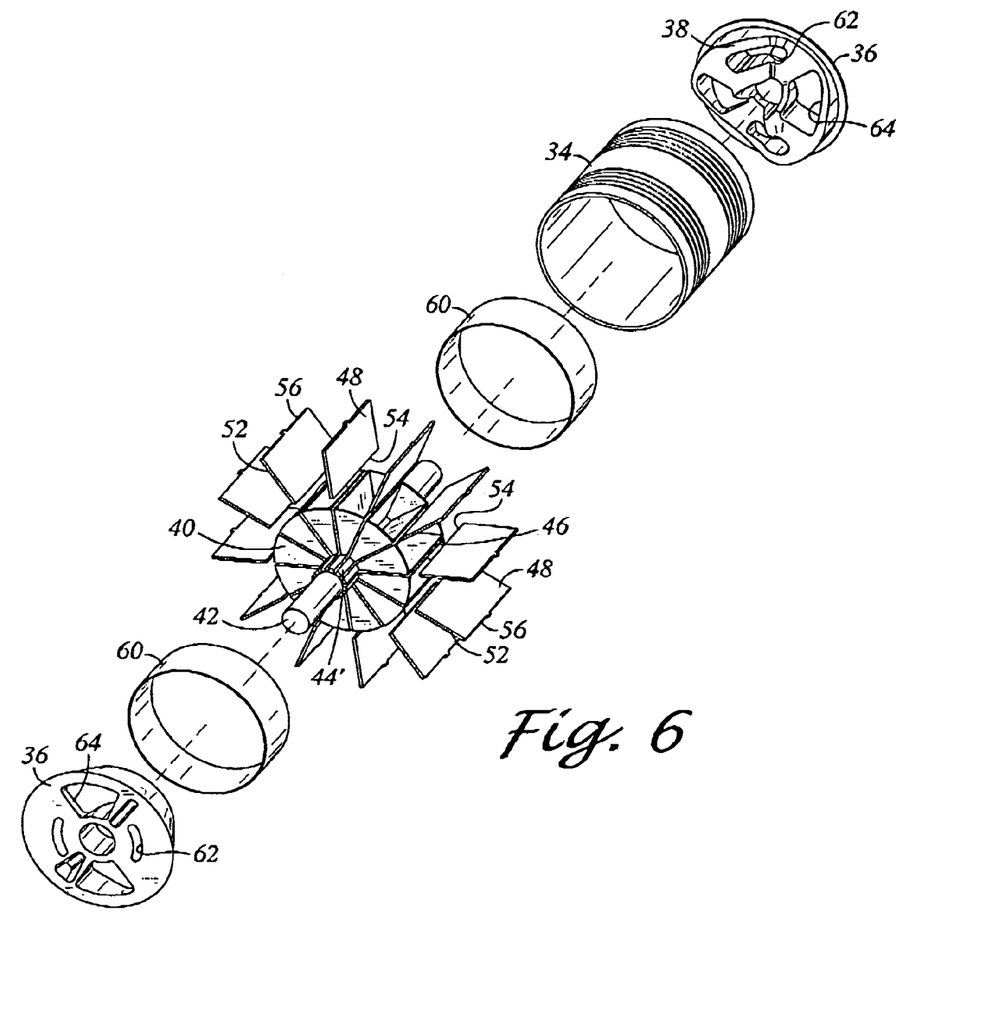
FIG. 6 is an exploded perspective view of an expander of the microturbine system.

FIG. 5, wherein like numbers denote like parts and functions, illustrates, in exploded view, the positive displacement axial vane compressor 12. Likewise, FIG. 6, wherein like numbers denote like parts and functions, illustrates the positive displacement axial vane expander 14. The components are essentially the same for each of the devices and have been identified above in connection with FIG. 2. In the embodiment of the compressor 12 shown in FIG. 5 and the expander 14 in FIG. 6 each of the end walls 38 is provided with a pair of inlet ports 62 and a pair of outlet ports 64. Thus, intake and exhaust of the driving fluid occurs at both ends of the compressor 12 and expander 14. Two intake and exhaust cycles occur at each side of the compressor 12 and expander 14 so that each provides the positive displacement functions of a sixteen cylinder positive displacement device.

The driving fluid is a compressible, non-hazardous fluid such as, for example, air, natural gas, propane, methane, butane, carbon dioxide, land fill gas and mixtures thereof. Preferably, the driving fluid also serves as the fuel for the combustor as well as the fluid for powering the expander 14. A preferred driving fluid is air since it is readily available, easily compressed and contains oxygen to support combustion when combine with a suitable combustible fuel.

It will be understood that non-combustible gases can be employed if mixed with air/fuel mixture to support combustion for heating the inert gas to a desired inlet temperature at the expander 14. It will also be understood that, depending on the driving fluid and economics, the system 10 may be closed so that exhausted driving fluid is recovered for recycling to the compressor 12.

The recuperator 20 is a conventional fin type heat exchanger in which the heat from the exhaust from the expander 14 is recovered for preheating the compressed driving fluid prior to its entering the expander thus resulting in fuel economy by reducing the energy necessary to heat the driving fluid to a desired expander inlet temperature. Likewise, the combustor 18 may be of any conventional design currently used for commercially available microturbines.

The construction and operation of a typical microturbine system 10 in accordance with the invention will be described hereinafter in connection with the use of air as the driving fluid.

The microturbine system, as shown in FIG. 1 is designed as follows. A positive displacement axial vane rotary compressor 12 has an outside diameter of 24 in. and length of 26 ½ inches. The compressor 12 is designed to for the output of 5000 in.$^3$ of compressed air per revolution. The compressor 12 has a vane height of 8 in. and a vane stroke of 4 in. and contains 12 vanes. and is designed to operate at 1800 revolutions per minute and to produce an outlet pressure of 100 psig. The inlet temperature and the inlet pressure of the driving fluid, air, is ambient. The compressor 12 is calculated to have a displacement of 5044 in.$^3$ at a flow rate of 5254 scfm. The housing 34 and the rotor 16 of the compressor 12 can be comprised of a standard aluminum alloy and the vanes 48 of the compressor may comprise a PEEK impregnated carbon fiber cloth. The compressor 12 includes four intake ports 62 and four discharge ports 64. Preferably a thermal barrier coating is provided on all surfaces including the ports 62 and 64 except for the cam faces 38 and the vanes 48.

The positive displacement, axial vane rotary expander 14 is designed with an outside diameter of 36 in. and a vane height of 14 in. The expander 14 is designed to operate at 1800 revolutions per minute with an inlet pressure of 100 psig and an inlet temperature of between 1800° F. to a maximum of 0.2633° F. The expansion ratio of the air is 7.8/1 and when operated at the maximum temperature based upon theoretical heat loss during expansion the exhaust temperature is calculated to be 617° F.

The expander 14 preferably comprises a ferrous alloy housing 34 and rotor 60. However, titanium alloy is an option for the construction for the housing 34 and rotor 60 for a lighter weight unit. The vanes 52 are comprised of a resistant ceramic composite and a thermal barrier coating is provided on the cam faces 38, rotor 40 and ports 62 and 64.

Figure 7:
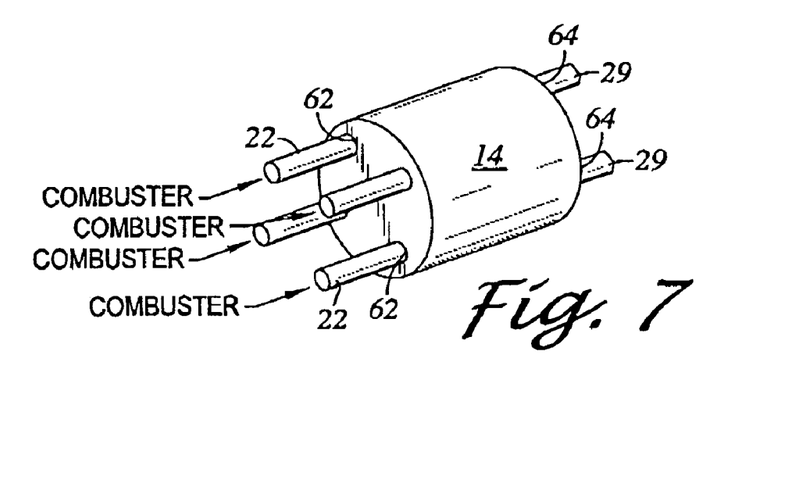
FIG. 7 is schematic diagram of an embodiment of the expander adapted for a combustor for each inlet port.

To produce the maximum inlet temperature to the expander 14, as shown in FIG. 7, a combustor 18 is provided for each inlet port 62. if less power is required one or more of the combustors can be shut down which reduces both the brake horsepower power output and which also results in a lowering of the break thermal efficiency. The combustor 18 is of conventional design and the fuel utilized is propane from a source of liquefied propane (not shown). It should be understood, however, that the combustor 18 may be designed to operate on any type of fuel such as, for example, diesel fuel, natural gas or even gasoline. Liquefied gas fuels are preferred because the omissions are low as compared to other fuels such as diesel or gasoline.

The rotors 40 of both the compressor 12 and the expander 14 are oil cooled by conventional lubricating oil. The remaining components of the system are not actively cooled although the exterior housing (not shown) of the system 10 can be convection cooled with a localized fins as necessary.

The recuperator 20 is a conventional fin type heat exchanger that is designed to transfer over 90,000 BTU/min when the expander 14 is operated at the maximum inlet temperature of 2633° F. and an exhaust temperature of 617° F.

In operation air is introduced to the compressor 12 at ambient pressure and temperature (about 70° F.) where it is compressed to about 100 psi. The compressed air is led through the duct 24 to the recuperator where it is preheated and then led through the duct 26 to the combustor 18. For the purposes of this description there are four combustors 18, one combustor for each inlet port 62 of the expander 14. By the use of the four combustors 18 a maximum temperature of 2633° F. is achieved for the inlet air to the expander 14. The compressed heated air is introduced to the expander 14 during its compression cycle where the spacing between adjacent vanes 28 is at a minimum. The hot compressed air acts against the vanes 28 to expand the space between adjacent vanes, which expansive force is translated into rotation for driving the shaft 26. The expansion of the hot compressed air results in a reduction in its temperature that is calculated to be about 617° F. The exhaust gas is then led through the duct 29 back to the recuperator 24 for preheating the compressed air from the compressor 12. This results in further cooling of the exhaust air which then exits through exhaust duct 30 at near ambient temperature.

Table 1 below summarizes the key potentials for the system as described.

TABLE 1

| Output | Units |
|---|---|
| Shaft Power | 1039 Horsepower |
| Brake Specific Fuel Consumption | .342 Lbs/bhp-hr |
| Brake Thermal Efficiency | 40 Percent |
| Expander Inlet Temperature | 2633° F. |
| Exhaust Temperature | 617° F. |
| Regenerator Heat Transfer | 90875 Btu/min |
| Compressor Discharge Temperature | 406° F. |

Figure 8:
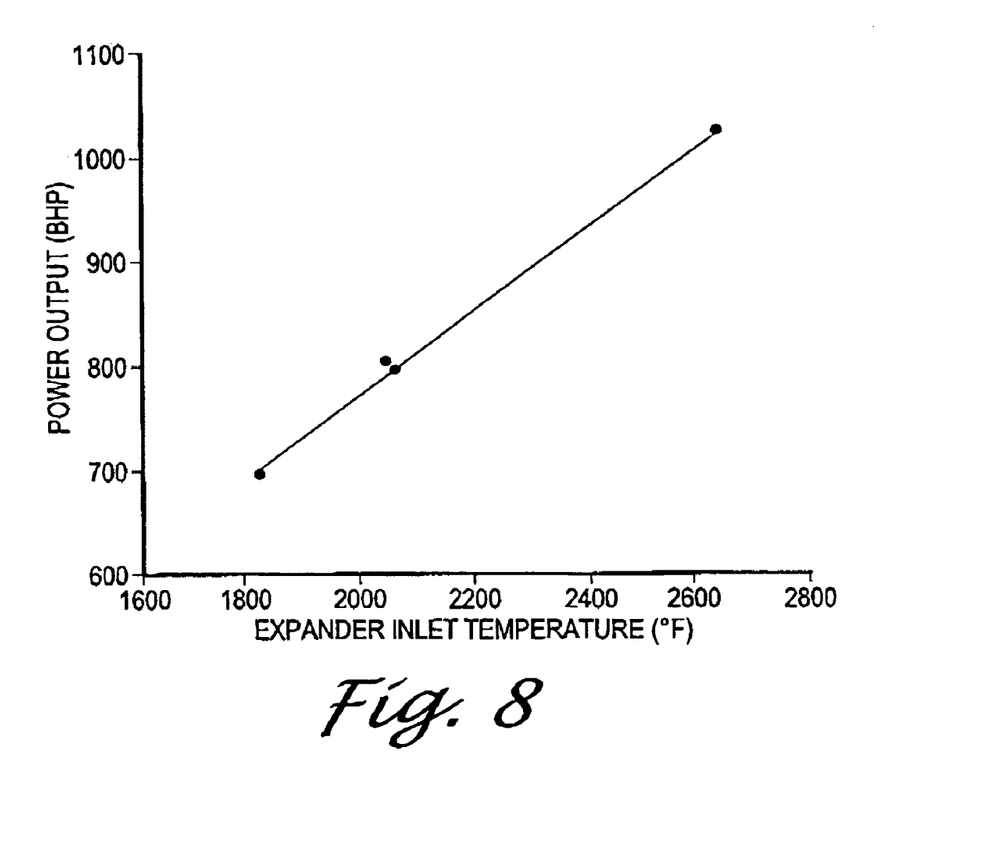
FIG. 8 is a plot of power output versus expander inlet temperature.
Figure 9:
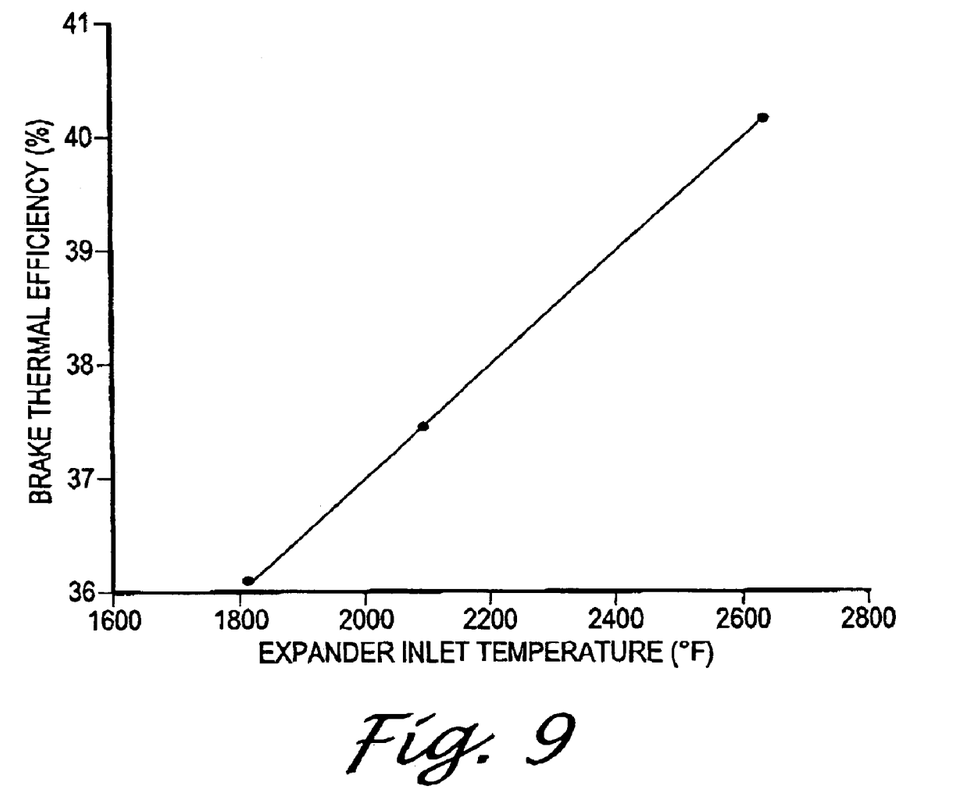
FIG. 9 is a plot of break thermal efficiency against expander inlet temperature.

Referring to FIGS. 9 and 10 it will be seen that the higher the temperature of the air entering the expander 14 the greater are both the power output and thermal efficiency of the system 10. As illustrated by FIG. 7 power output at 1800° F. is about 700 bhp and increases to about 1000 bhp at the maximum temperature in excess of 2600° F. Likewise, as illustrated by FIG. 8 break thermal efficiency over the same temperature range increases from about 36% to about 40% at the maximum inlet temperature.

Calculating several variables, such as compressor efficiency, expander efficiency and mechanical efficiency among others, for a conventional microturbine system of equivalent scale to the system described above, it will be seen that the positive displacement compressor/expander of the present system represents a substantial improvement over the conventional microturbine. In addition, utilizing the positive displacement axial vane compressor 12 and expander 14, the system 10 of the present invention can operate at substantially lower rpm which permitss the use of lower-priced electrical generating equipment then is the case for a conventional microturbine electrical generating system that operates at a higher RPM (on the order of 1500 rpm) and thus requires expensive electrical generating equipment to operate at such speed. The variables calculated for the system described above and for an equivalent microturbine system are set forth in Table 2 below.the calculations are based on operation of the two systems at an expander air inlet temperature of about 2000° F. and at a lower air inlet temperature of about 1800° F.

TABLE 2

| Output | Axial Vane Rotary System | | Conventional Microturbine | |
|---|---|---|---|---|
| | @2000° F. | @1808° F. | @2000° F. | @1808° F. |
| Shaft Power (bhp) | 791 | 694 | 414 | 195 |
| Brake Specific fuel consumption (lbs/bhp-hr) | .365 | .378 | .483 | .903 |
| Brake Thermal Efficiency (%) | 37.5 | 36.2 | 28.4 | 15.2 |
| Expander Inlet Temperature (° F.) | 2058 | 1808 | 2106 | 1808 |

TABLE 2-continued

| Output | Axial Vane Rotary System | | Conventional Microturbine | |
| --- | --- | --- | --- | --- |
| | @2000° F. | @1808° F. | @2000° F. | @1808° F. |
| Exhaust Temperature (° F.) | 528 | 492 | 559 | 606 |
| Compressor Discharge Temperature (° F.) | 406 | 406 | 345 | 332 |
| Compressor Efficiency (%) | 95 | 95 | 75 | 70 |
| Mechanical Efficiency (%) | 90 | 90 | 95 | 95 |

From table 2 it can be seen that the axial vane rotary system of the invention is capable of producing more shaft power at equivalent temperatures as compared to the conventional microturbine system. Likewise fuel consumption is somewhat less for the system of the present invention while thermal efficiency is greater than for the conventional microturbine system. The efficiency of the positive displacement axial vane rotary compressor is 95% while it ranges between 70 and 75% for the conventional microturbine system. The mechanical efficiency for the compressor of the conventional microturbine is slightly higher than the mechanical efficiency of applicant's positive displacement axial vane rotary compressor. Overall, however, the expected variables for the positive displacement microturbine system of the present invention are calculated to be superior to those of a conventional microturbine system.

As will be apparent to those skilled in the art, that various arrangements which lie within the spirit and scope of the invention other than those described in detail in the specification will occur to those persons skilled in the art. It is therefore to be understood that the invention is to be limited only by the claims appended hereto.

I claim:

1. A method for the generation of mechanical and electrical power comprising the steps of:
   a. introducing a driving fluid at ambient pressure and temperature to a positive displacement axial vane rotary compressor to compress said driving fluid;
   b. compressing said driving fluid;
   e. preheating said compressed driving fluid;
   d. heating said preheated compressed driving fluid to a temperature of between about 1800° F. to about 2600° F.;
   f. introducing said compressed and heated driving fluid to an axial vane rotary expander whereby the expansion of said driving fluid in said expander is translated to rotation for driving an output shaft.

2. The method of claim 1 wherein said compressed and heated driving fluid is selected from the group consisting of air, propane, methane, butane, carbon dioxide, natural gas, landfill gas and mixtures thereof.

3. The method of claim 1 further including the step of recovering said heated driving fluid from said axial vane rotary expander and passing it through a heat exchanger to recover heat energy therefrom.

4. The method of claim 3 further including the step of passing said compressed driving fluid through said heat exchanger thereby to preheat said driving fluid prior to heating it for introduction to said expander.

5. A microturbine system for the generation of electrical and mechanical power, said microturbine system including a positive displacement axial vane compressor and a positive displacement axial vane expander, said expander including at least one inlet port for the introduction of a driving fluid to said expander and a combustor for each said inlet port.

6. The microturbine system of claim 5 wherein said expander includes four said inlet ports and a combustor for each of said inlet ports.

* * * * *